United States Patent
Yamazaki et al.

(10) Patent No.: US 7,229,582 B2
(45) Date of Patent: Jun. 12, 2007

(54) METHOD OF TWO-STAGE INJECTION MOLDING OF AIR CONDITIONER OUTLET VENT DEVICE

(75) Inventors: Akira Yamazaki, Meiwa-machi (JP); Yasufumi Watanabe, Meiwa-machi (JP); Hideki Baba, Meiwa-machi (JP)

(73) Assignee: Moriroku Kabushiki Kaisha, Tokyo (JP)

(*) Notice: Subject to any disclaimer, the term of this patent is extended or adjusted under 35 U.S.C. 154(b) by 0 days.

(21) Appl. No.: 10/406,601

(22) Filed: Apr. 4, 2003

(65) Prior Publication Data
US 2004/0195721 A1   Oct. 7, 2004

(51) Int. Cl.
*B29C 45/14* (2006.01)
(52) U.S. Cl. .................... 264/242; 264/250
(58) Field of Classification Search ............... 264/242, 264/250, 255, 264, 275, 328.7, 328.8; 425/129.1, 425/130, 123, 577
See application file for complete search history.

(56) References Cited

U.S. PATENT DOCUMENTS

| | | | | |
|---|---|---|---|---|
| 3,443,005 A | * | 5/1969 | Braun | 264/245 |
| 4,414,170 A | * | 11/1983 | Sano | 264/242 |
| 4,546,695 A | * | 10/1985 | Ouchi et al. | 454/319 |
| 4,702,156 A | * | 10/1987 | Sano | 454/313 |
| 5,340,357 A | * | 8/1994 | Nagai et al. | 454/155 |
| 5,350,555 A | * | 9/1994 | Tsuda et al. | 264/242 |
| 5,352,399 A | * | 10/1994 | Hashimoto et al. | 264/242 |
| 5,421,718 A | * | 6/1995 | Karlsson et al. | 425/577 |
| 6,261,499 B1 | * | 7/2001 | Okeke et al. | 264/242 |
| 6,454,645 B1 | * | 9/2002 | Baba et al. | 454/155 |
| 6,685,555 B1 | * | 2/2004 | Davis et al. | 454/155 |

FOREIGN PATENT DOCUMENTS

JP          6-166053          6/1994

* cited by examiner

*Primary Examiner*—Edmund H. Lee
(74) *Attorney, Agent, or Firm*—Arent Fox LLP

(57) ABSTRACT

A method of two-stage injection molding of an air conditioner outlet vent device is provided, the device including a housing, a plurality of blades pivotably supported by the housing and disposed in parallel to each other within the housing, and a link operatively connecting the blades. The plurality of blades are injection-molded in a secondary injection step subsequent to a primary injection step in which the housing is molded. In the secondary injection step, a molten resin is injected into cavities formed within a mold device in a closed mold state from a plurality of gates provided in portions of the mold device corresponding to projections of the blades. It is thus possible to improve the strength of link shafts and the projections while preventing any malfunction of the blades pivoting and any deterioration of the surface appearance, as well as to increase the degrees of freedom in changing the gate diameter.

2 Claims, 8 Drawing Sheets

METHOD OF TWO-STAGE INJECTION MOLDING OF AIR CONDITIONER OUTLET VENT DEVICE

BACKGROUND OF THE INVENTION

1. Field of the Invention

The present invention relates to an improvement in a method of two-stage injection molding of an air conditioner outlet vent device that includes a synthetic resin housing, a plurality of synthetic resin blades, and a link, the blades being pivotably supported by the housing and disposed in parallel to each other within the housing, and the link operatively connecting the blades, wherein the plurality of blades are injection-molded in a secondary injection step subsequent to a primary injection step in which the housing is molded.

2. Description of the Related Art

Conventionally, such a two-stage injection molding method is already known from, for example, Japanese Patent Application Laid-open No. 6-166053.

As shown in FIG. 8, when injection-molding, in a secondary injection step, a plurality of blades 19 each integrally having a blade main body 22, a pair of support shafts 23 projecting from the blade main body 22, a pair of projections 24 projecting from the blade main body 22 at positions displaced to the rear of the support shafts 23, and a link shaft 25 having an axis parallel to the support shafts 23 and being connected to the two projections 24, in the above-mentioned conventional method, a gate 51' is formed in a mold 42' so as to inject a molten resin into a cavity 49 corresponding to the blade 19, in a portion corresponding to the rear edge of the blade main body 22 at a position away from the two projections 24.

However, when setting the position at which the molten resin is injected as described above, since the link shaft 25 is the last to be molded, there is a possibility that it might not be filled with sufficient molten resin resulting in an incomplete shape, or even if the external shape is molded, the resin density might be insufficient resulting in an inadequate strength.

In order to avoid such a situation, if an attempt is made to fill the portion corresponding to the link shaft 26 with sufficient molten resin, unnecessary filling pressure is exerted on portions other than the link shaft 25, thus causing the generation of flashing, or over-filling the interiors of shaft holes 21A and 21B of a housing 13 for the left and right support shafts 23 to make it difficult for the blades 19 to pivot. Furthermore, in the case where the injection speed for the blades 19 has to be increased in order to control the molding time for the blades 19 so as to synchronize it with molding of the housing 13 having a small volume, or in the case where a synthetic resin having a high injection speed such as PE, which has a low viscosity, is used, the surface of the blade 19 after completion of the two-stage injection-molding tends to have flow marks, etc., thereby degrading the surface appearance.

Moreover, if the molten resin is injected into the interior of the cavity 49 at a position away from the projections 24 as described above, a weld line tends to occur in a base part of the projections 24, and if talc, etc. is mixed with the molten resin in order to improve the rigidity of the blade 19, the weld strength of the base parts of the projections 24 might decrease resulting in that the strength of the link shaft 25 is not sufficient. Furthermore, since the diameter of a part of the gate 51' through which the molten resin is injected into the cavity 49, and which corresponds to the blade main body 22, cannot be set greater than the thickness of the blade main body 22, the degrees of freedom in changing the gate diameter are limited.

SUMMARY OF THE INVENTION

The present invention has been achieved in view of the above-mentioned circumstances, and it is an object of the present invention to provide a method of two-stage injection molding of an air conditioner outlet vent device, the method being capable of enhancing the strength of a link shaft and a projection while avoiding malfunction in pivoting of a blade and degradation in surface appearance, and of having greater degrees of freedom in changing a gate diameter.

In order to achieve the above-mentioned object, in accordance with a first aspect of the present invention, there is proposed a method of two-stage injection molding of an air conditioner outlet vent device that includes a synthetic resin housing having a pair of side walls having a plurality of matching pairs of shaft holes provided therein; a plurality of synthetic resin blades integrally having a blade main body, support shafts projecting from the blade main body so as to be pivotably fitted in a matching pair of the shaft holes, a projection projecting from the blade main body at a position displaced to the rear of the support shafts, and a link shaft having an axis parallel to the support shafts and being connected to the projection, the blades being disposed in parallel to each other within the housing; and a link for connecting the link shafts of the blades; the method including a primary injection step of molding the housing; and a subsequent secondary injection step of injection-molding the plurality of blades while utilizing the shaft holes of the housing as support shaft formation cavities; wherein, in the secondary injection step, a molten resin is injected into cavities formed within a mold device in a closed mold state from a plurality of gates provided in portions of the mold device corresponding to the projections of the blades.

In accordance with the above-mentioned arrangement of the first aspect, when molding the blades in the secondary injection step, the molten resin is injected into the cavity within the mold device in the closed mold state from the portions corresponding to the projections of the blades. Because of this, portions of the cavity corresponding to the projections and the link shafts are filled with the molten resin at the beginning of the injection of the molten resin. It is therefore possible to prevent the portions corresponding to the projections and the link shafts from being incompletely filled, prevent the projections and the link shafts from having imperfect shapes, and also prevent inadequate strength caused by insufficient resin density even if the external shape is molded. As a result, it is unnecessary to take measures to fill the portions corresponding to the link shafts with sufficient molten resin, and it is therefore possible to prevent the formation of flashing and prevent the left and right support shafts from being overfilled within the shaft holes of the housing, thus ensuring that the blades can pivot smoothly, and any deterioration of the surface appearance can be prevented even when the injection speed is increased. Furthermore, weld lines are not caused in base parts of the projections; even when talc, etc. is mixed with the molten resin, the weld strength of the base parts of the projections does not deteriorate, and changing the thickness of the projections enables the gate diameter to be changed, thereby increasing the degrees of freedom in changing the gate diameter. Moreover, changing the positions of the projections enables the position of the gate to be changed, thereby increasing the degrees of freedom in setting the molding conditions, so that it is possible to mold blades under the best molding conditions.

Furthermore, in accordance with a second aspect of the present invention, in addition to the first aspect, there is proposed a method of two-stage injection molding of an air conditioner outlet vent device, wherein molding of the housing in the primary injection step and molding of the blades in the secondary injection step are carried out in synchronization at positions adjacent to each other. In accordance with the second aspect, an air conditioner outlet vent device can be formed by efficiently carrying out the two-stage injection molding.

The above-mentioned object, other objects, characteristics and advantages of the present invention will become apparent from an explanation of a preferred embodiment that will be described in detail below by reference to the attached drawings.

BRIEF DESCRIPTION OF THE DRAWINGS

FIGS. 1 to 7 illustrate one embodiment of the present invention, wherein

FIG. 1 is a perspective view of an air conditioner outlet vent device;

FIG. 2 is an exploded perspective view of the air conditioner outlet vent device;

FIG. 3 is a cross section along line 3-3 in FIG. 1;

FIG. 4 is a cross section along line 4-4 in FIG. 3;

FIG. 5 is a longitudinal cross section of a two-stage injection-molding device during molding;

FIG. 6 is an enlarged cross section along line 6-6 in FIG. 5; and

FIG. 7 is a longitudinal cross section of the two-stage injection-molding device when taking out a molding and exchanging molds.

DESCRIPTION OF PREFERRED EMBODIMENT

One embodiment of the present invention is explained below by reference to FIGS. 1 to 7. Firstly, in FIGS. 1 to 3, a housing 11 of an air conditioner outlet vent device is formed by joining a front housing 12 made of a synthetic resin in the form of a rectangular cylinder to a rear housing 13 made of a synthetic resin in the form of a rectangular cylinder, to form an outlet vent 14 having a rectangular cross section.

The housing 11 is mounted in, for example, an instrument panel of a passenger vehicle, in a manner such that it can be pivoted in the vertical direction, so as to connect the open rear end of the housing 11 to an air supply duct of an air conditioner.

Figure 1:
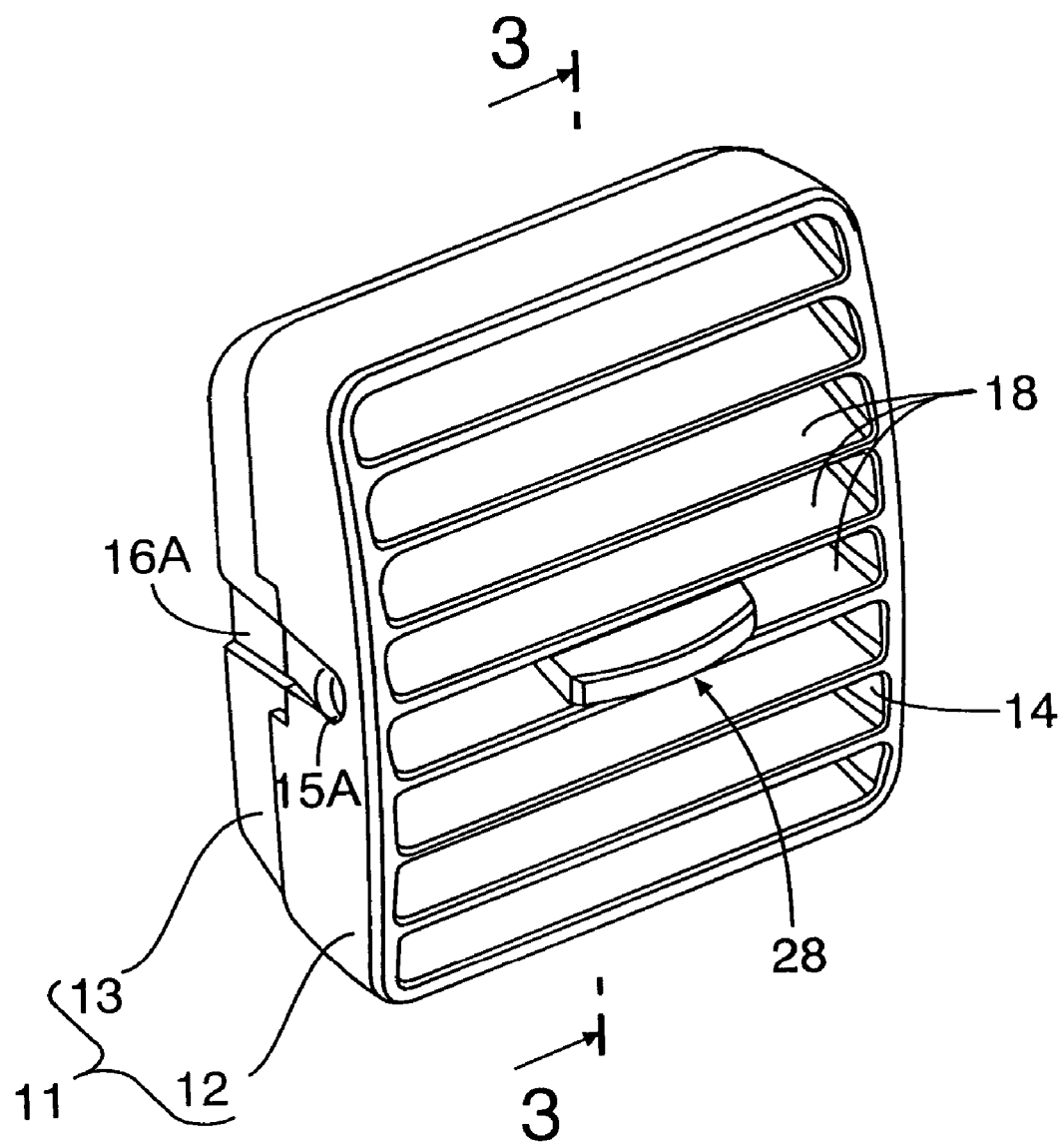
Figure 2:
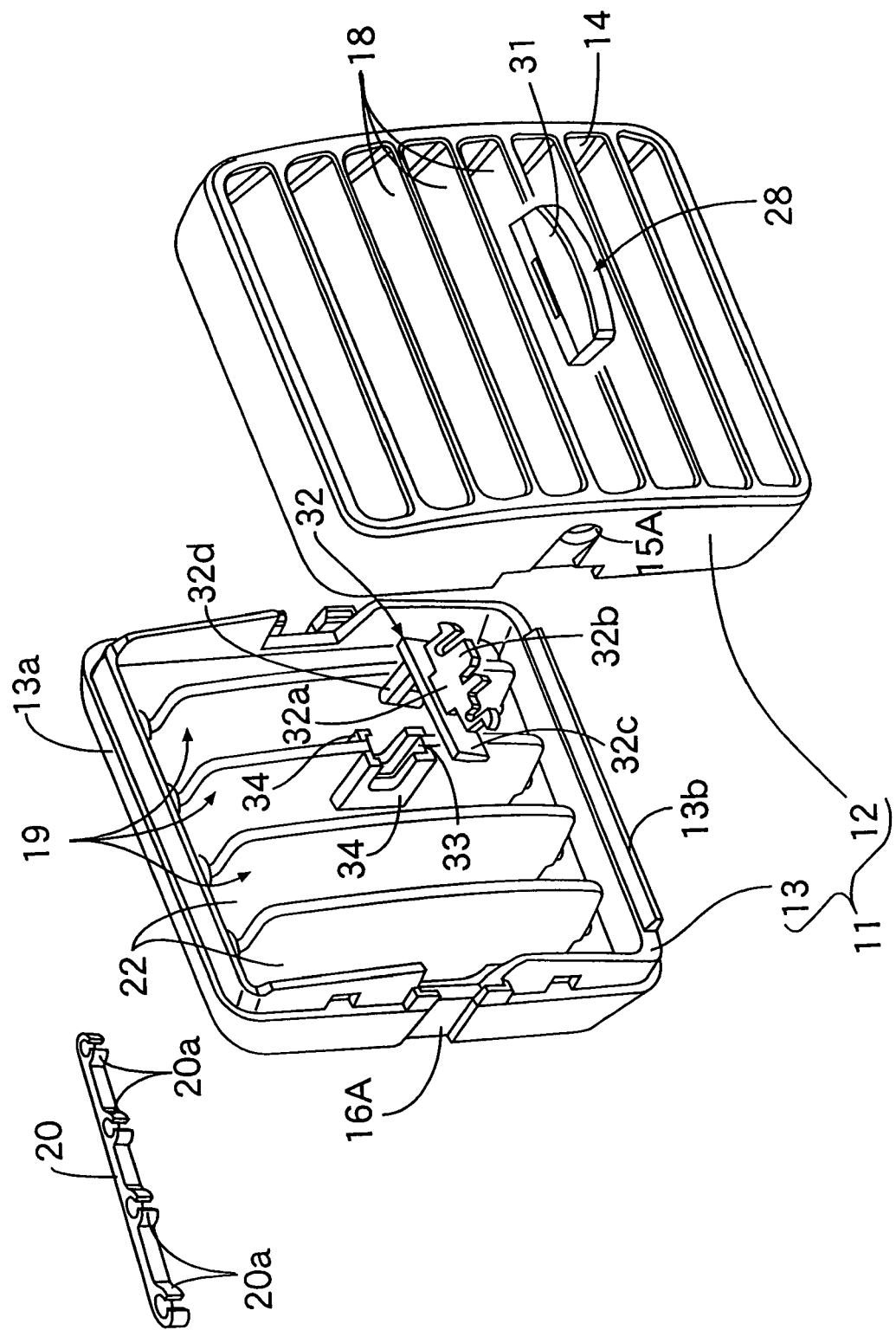
Figure 3:
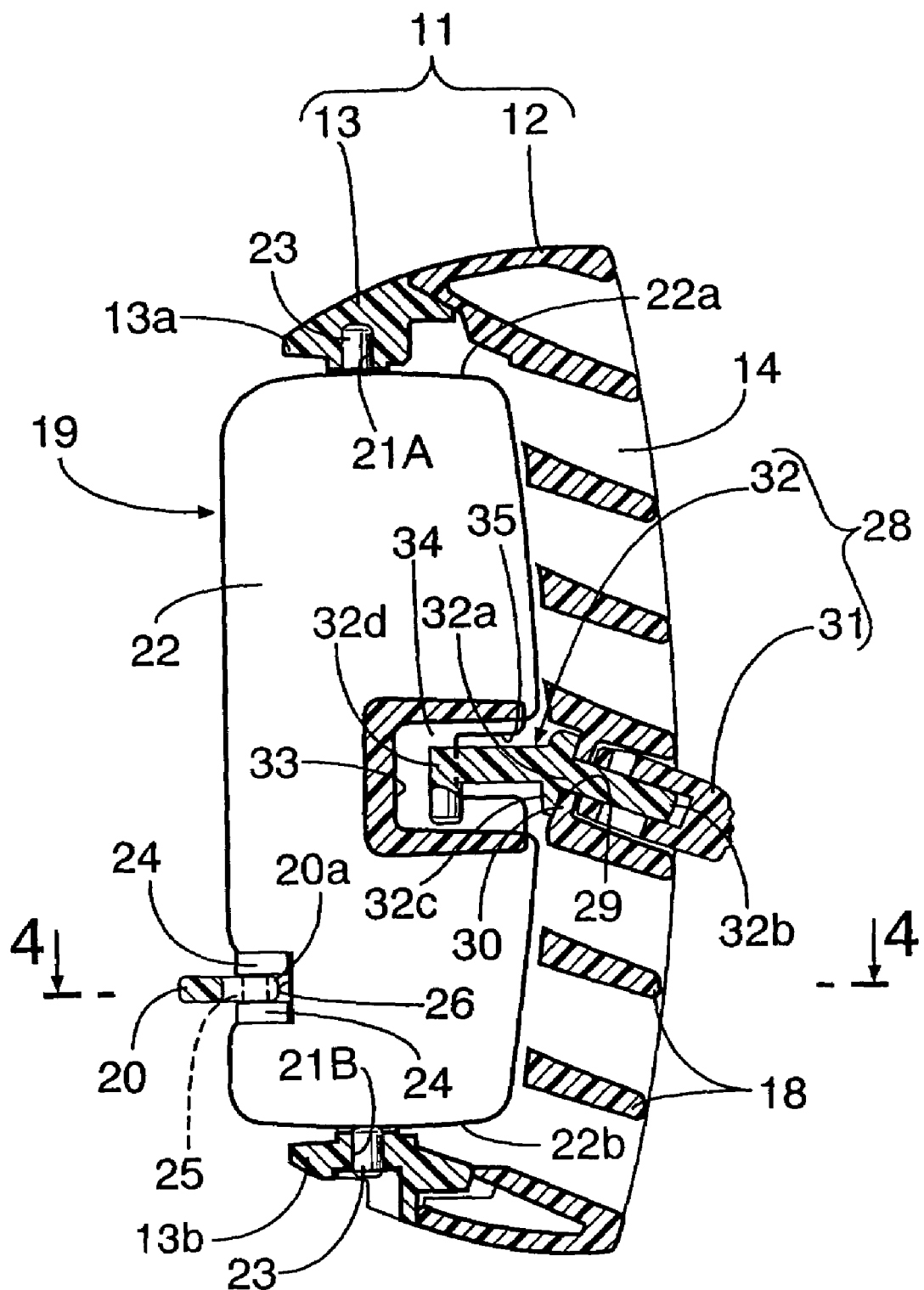
Figure 4:
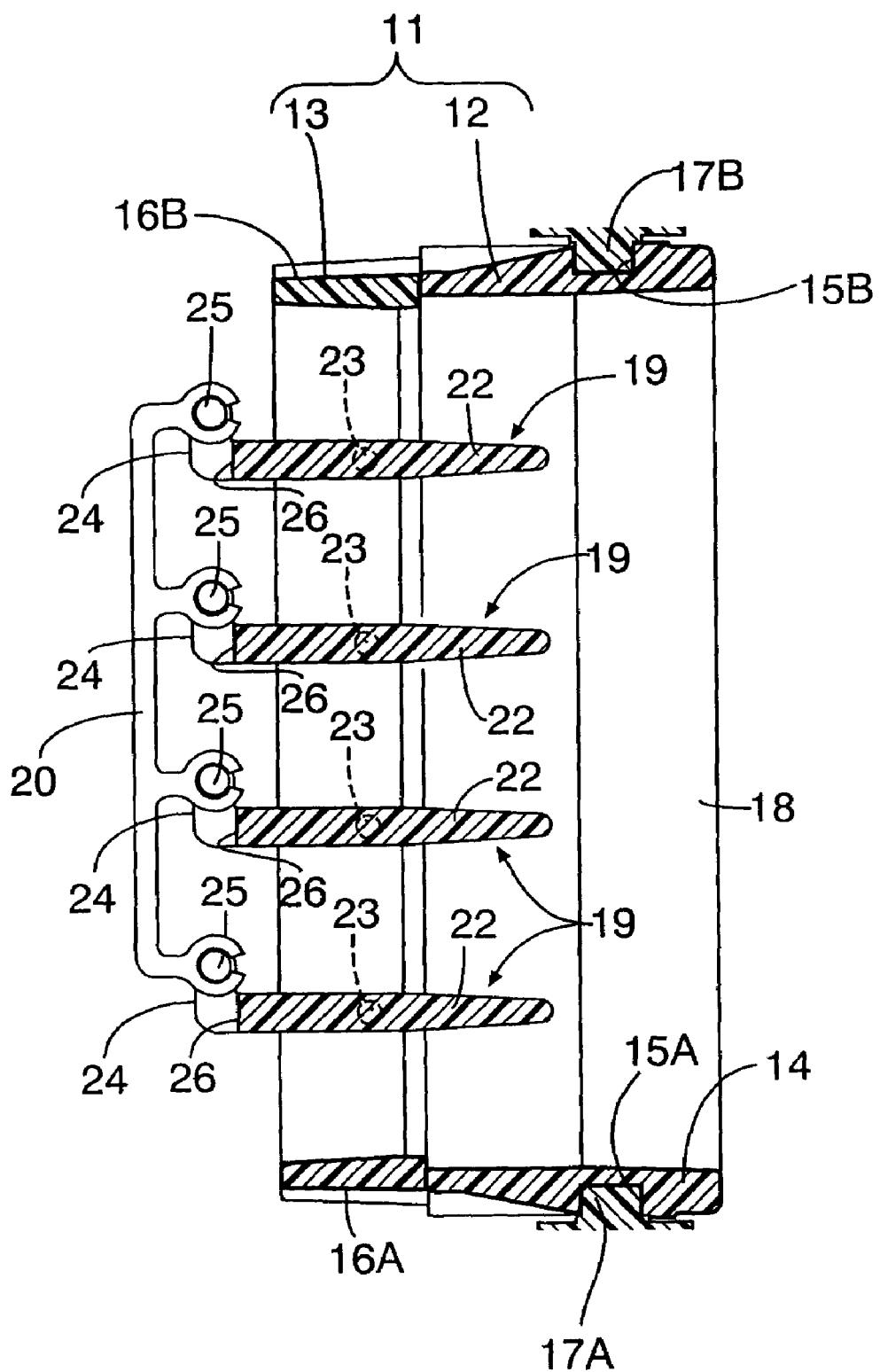

Referring additionally to FIG. 4, bottomed support holes 15A and 15B are coaxially provided on opposite sides of the front housing 12. Grooves 16A and 16B, whose forward ends are connected to the support holes 15A and 15B, are provided on opposite sides of the front housing 12 and the rear housing 13 so that the rear ends of the grooves 16A and 16B are open. Each of the grooves 16A and 16B is formed so that the depth thereof at the forward end decreases as it approaches the corresponding support holes 15A and 15B. Shafts 17A and 17B are provided in the instrument panel. By pushing the housing 11 backward in a state in which the shafts 17A and 17B are fitted into the rear ends of the corresponding grooves 16A and 16B, the shafts 17A and 17B move over shallow sections of the grooves 16A and 16B and fit into the support holes 15A and 15B. The housing 11 is thereby mounted in the instrument panel in a manner such that it can be pivoted in the vertical direction. Moreover, the position of the housing 11 that has pivoted in the vertical direction can be maintained by a frictional force between the shafts 17A and 17B and the front housing 12.

A plurality of first blades 18 extending in the lateral direction are formed integrally with the front housing 12 so that the first blades 18 are arranged in the vertical direction in the outlet vent 14. The direction of air oriented by the first blades 18 is determined by the position of the housing 11, that is, the front housing 12 that has pivoted in the vertical direction.

A plurality of second blades 19 are arranged in the outlet vent 14 behind the first blades 18 in a direction perpendicular to the direction in which the first blades 18 are arranged. These second blades 19 are supported in the rear housing 13 so that they can pivot around their respective axes which are parallel to each other. Each of the second blades 19 is linked to a common link 20.

The rear housing 13 is formed in a rectangular shape having a pair of upper and lower side walls 13a and 13b in which a plurality of matching pairs of shaft holes 21A and 21B are provided. The shaft holes 21A are provided with a bottomed shape in the upper side wall 13a, and the shaft holes 21B are provided in the lower side wall 13b so as to run through it.

Each of the second blades 19 integrally has a blade main body 22 formed in a rectangular shape having a pair of side surfaces 22a and 22b that face the opposite side walls 13a and 13b of the rear housing 13, support shafts 23 projecting from the opposite side surfaces 22a and 22b of the blade main body 22 so as to be pivotably fitted in a matching pair of the shaft holes 21A and 21B, a pair of projections 24 projecting from the blade main body 22 at a position displaced to the rear of the support shafts 23, and a link shaft 25 having an axis parallel to the support shafts 23 and connecting the two projections 24, the second blades 19 being disposed in parallel to each other within the rear housing 13.

Of the housing 11, at least the rear housing 13 is made of a first synthetic resin such as, for example, an ABS resin. On the other hand, the second blades 19 are made of a second synthetic resin that has a melting point lower than that of the first synthetic resin such as a polypropylene resin. The second blades 19 are molded by secondary injection within the rear housing 13 using the second synthetic resin having a melting point lower than that of the first synthetic resin while utilizing, as support shaft formation cavities for forming the support shafts 23, the shaft holes 21A and 21B provided in the rear housing 13 which is molded by primary injection using the first synthetic resin.

That is, the rear housing 13 and the second blades 19 are molded by a two-stage injection molding method. Since the synthetic resin used for forming the second blades 19 has a melting point lower than that of the synthetic resin used for forming the rear housing 13, sections of the second blades 19 and the rear housing 13 that are in contact with each other are not melt-bonded. Instead, the support shafts 23 of each of the second blades 19 become detached from the inner faces of the shaft holes 21A and 21B of the rear housing 13 due to thermal shrinkage after the secondary injection molding, so that the outer surfaces of the support shafts 23 are in moderate frictional contact with the inner faces of the shaft holes 21A and 21B.

Recesses 26 that open to the rear are formed in a lower rear part of each of the second blades 19. A pair of projections 24 project from the blade main body 22 so as to be connected to the upper and lower edges of each of the recesses 26, and project toward one side in the direction in which the second blades 19 are arranged, and a link shaft 25 connects the projections 24.

The link 20 has substantially C-shaped fittings 20a that fit resiliently around the link shafts 25 of the second blades 19 from the rear. Each of the second blades 19 is connected in common to the link 20 by engaging the fittings 20a with the corresponding link shafts 25.

The second blades 19 are operated so as to pivot by an operating knob 28 that can slide in the direction in which the second blades 19 are arranged, that is, in the lateral direction. In order to guide the sliding of the operating knob 28, a guide wall 30 having a guide hole 29 that is elongated in the longitudinal direction of the first blades 18, that is, in the lateral direction, is provided between a pair of vertically adjoining first blades 18 in approximately the middle of the housing 11 in the vertical direction.

The operating knob 28 is formed from a front knob 31 positioned forward relative to the guide wall 30 and a rear knob 32 connected to the front knob 31. The rear knob 32 integrally includes a neck 32a running slidably through the guide hole 29, an engagement part 32b that is provided so as to be connected to the forward end of the neck 32a and is inserted into and engaged with the front knob 31, a clamping plate 32c that is provided so as to be connected to the rear end of the neck 32a so that the guide wall 30 is interposed between the clamping plate 32c and the front knob 31 which is engaged with and connected to the engagement part 32b, and a substantially L-shaped engaging arm 32d projecting out of the clamping plate 32c toward the second blades 19.

A cut out recess 33 opening toward the first blades 18 is provided on one of the plurality of second blades 19 disposed approximately centrally with respect to the direction in which the second blades 19 are arranged. Moreover, a pair of covers 34 covering either side of the cut out recess 33 are provided integrally on this second blade 19. The engaging arm 32d of the operating knob 28 is inserted into the cut out recess 33 so that the rear end of the engaging arm 32d can engage with one of the two covers 34. Notches 35 are formed on both the covers 34 so as to receive a middle section of the engaging arm 32d.

Figure 5:
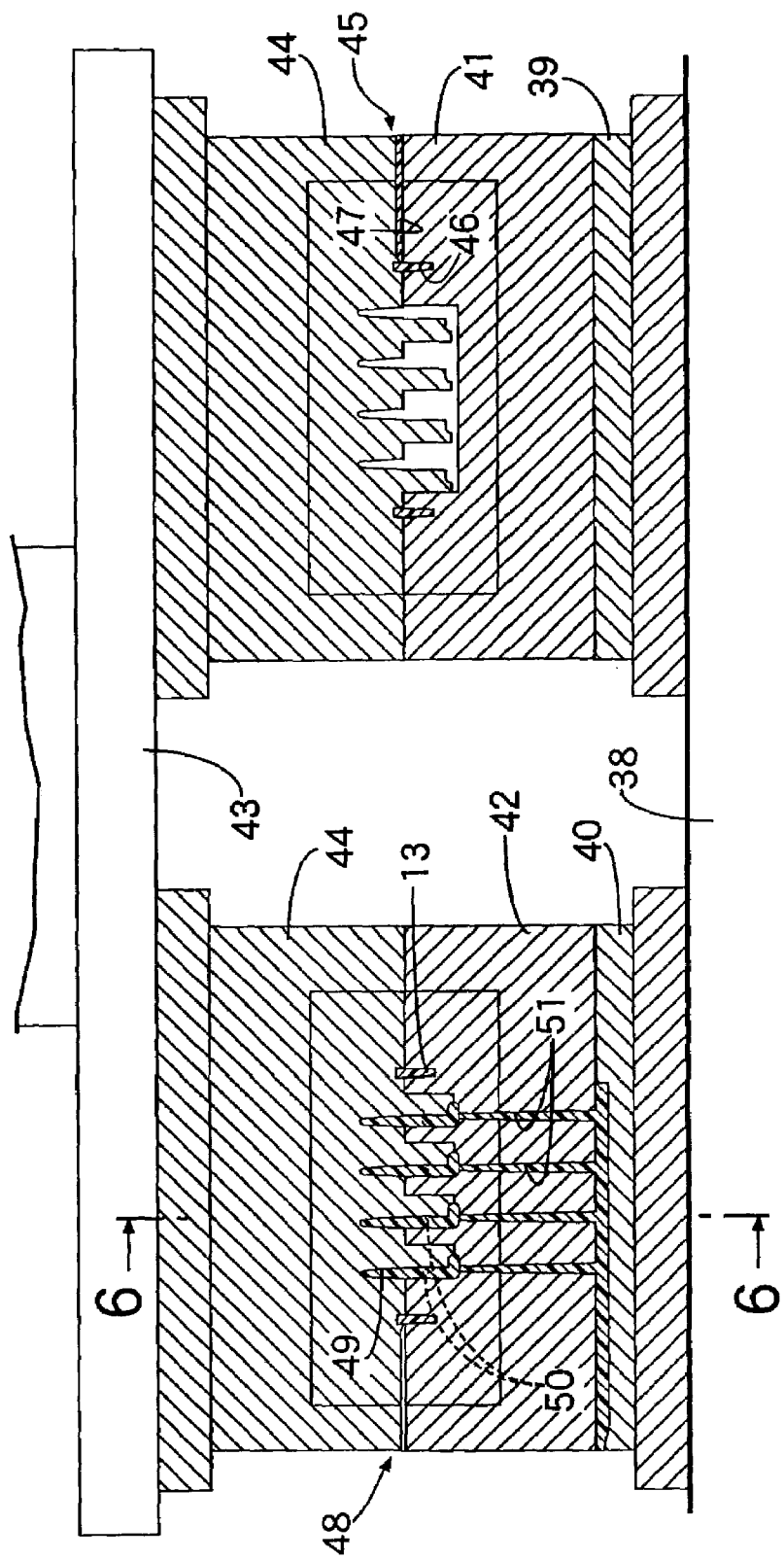

In FIG. 5, an injection molding device for two-stage injection-molding of the rear housing 13 of the housing 11 and the plurality of second blades 19 pivotably supported in the rear housing 13 of the air conditioner outlet vent device, includes a fixed pedestal 38, first and second receiving plates 39 and 40 fixed on top of the pedestal 38 with a space therebetween, a first lower mold 41 fixed on top of the first receiving plate 39, a second lower mold 42 disposed on top of the second receiving plate 40 so that it can be switched over between a state in which it is fixed on top of the second receiving plate 40 and a state in which it can move up and down above the second receiving plate 40, an up/down and pivot mount 43 that can move up and down above the first and second lower molds 41 and 42 and can pivot through 180 degrees at a time around a vertical axis passing through a central part between the two lower molds 41 and 42, and a pair of upper molds 44 that are fixed to the up/down and pivot mount 43 so as to correspond to the first and second lower molds 41 and 42.

The first lower mold 41 and one of the two upper molds 44 form a mold device 45 for molding the rear housing 13 in the primary injection step, and a gate 47 and a cavity 46 for forming the rear housing 13 are formed between the upper mold 44 and the first lower mold 41 in a closed mold state, a molten resin being injected into the cavity 46 through the gate 47.

Figure 6:
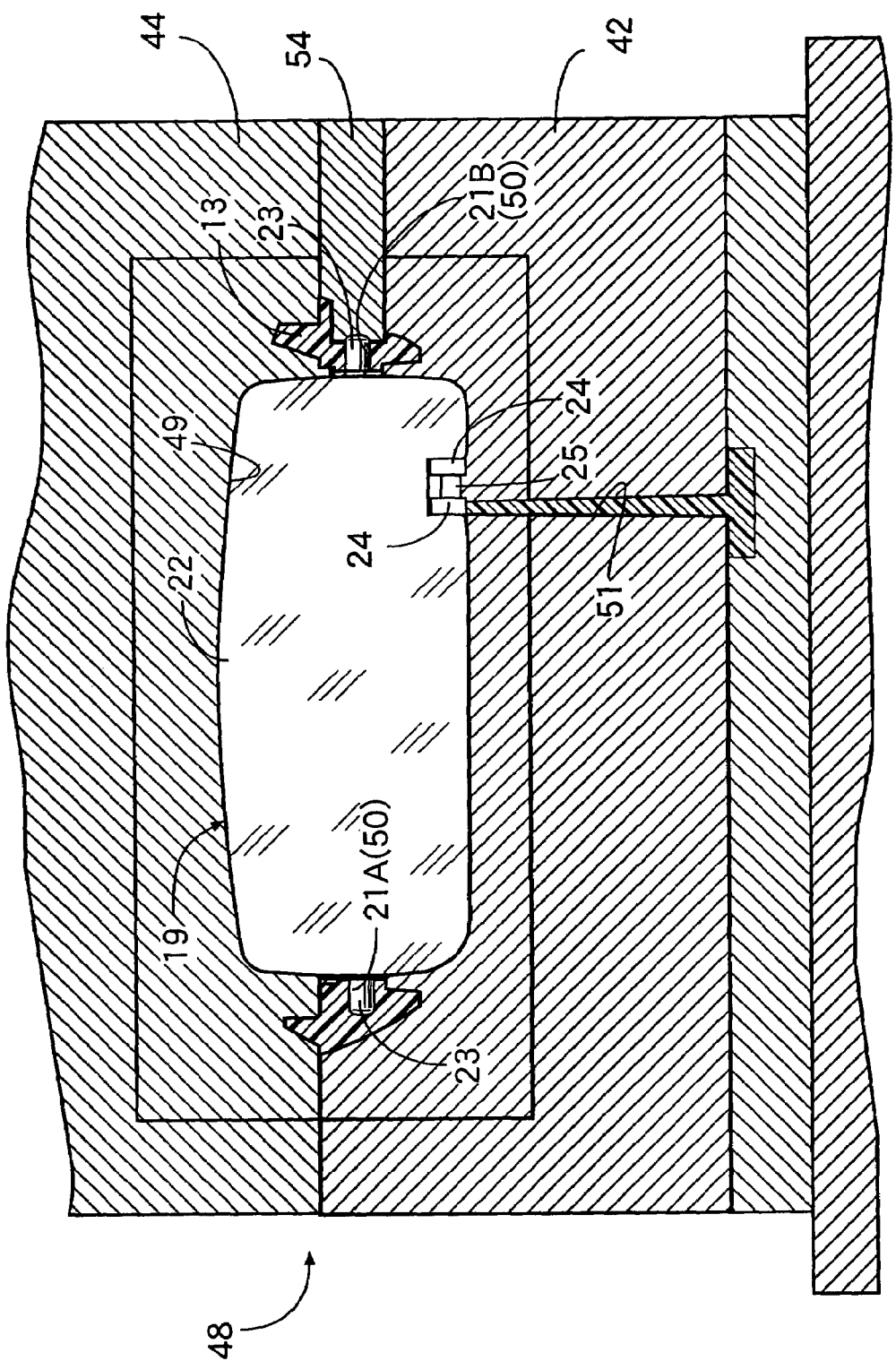

Referring also to FIG. 6, the other one of the two upper molds 44, the second lower mold 42, and a movable mold 54 slidably disposed on the second lower mold 42 form a mold device 48 for injection-molding the plurality of second blades 19 in the secondary injection step subsequent to molding of the rear housing 13 in the primary injection step. Formed between the upper mold 44 and the second lower mold 42, in a closed mold state with the rear housing 13 held, are cavities 49 for forming the plurality of second blades 19. The shaft holes 21A and 21B of the rear housing 13 held between the upper mold 44 and the second lower mold 42 communicate with the cavities 49 to function as support shaft formation cavities 50 for forming the support shafts 23 of the second blades 19.

A plurality of gates 51 are provided in the second lower mold 42 of the mold device 48 such that a molten resin is injected through the gates 51 into the cavities 49 in portions corresponding to at least one of the pair of projections 24 of the second blades 19.

Figure 7:
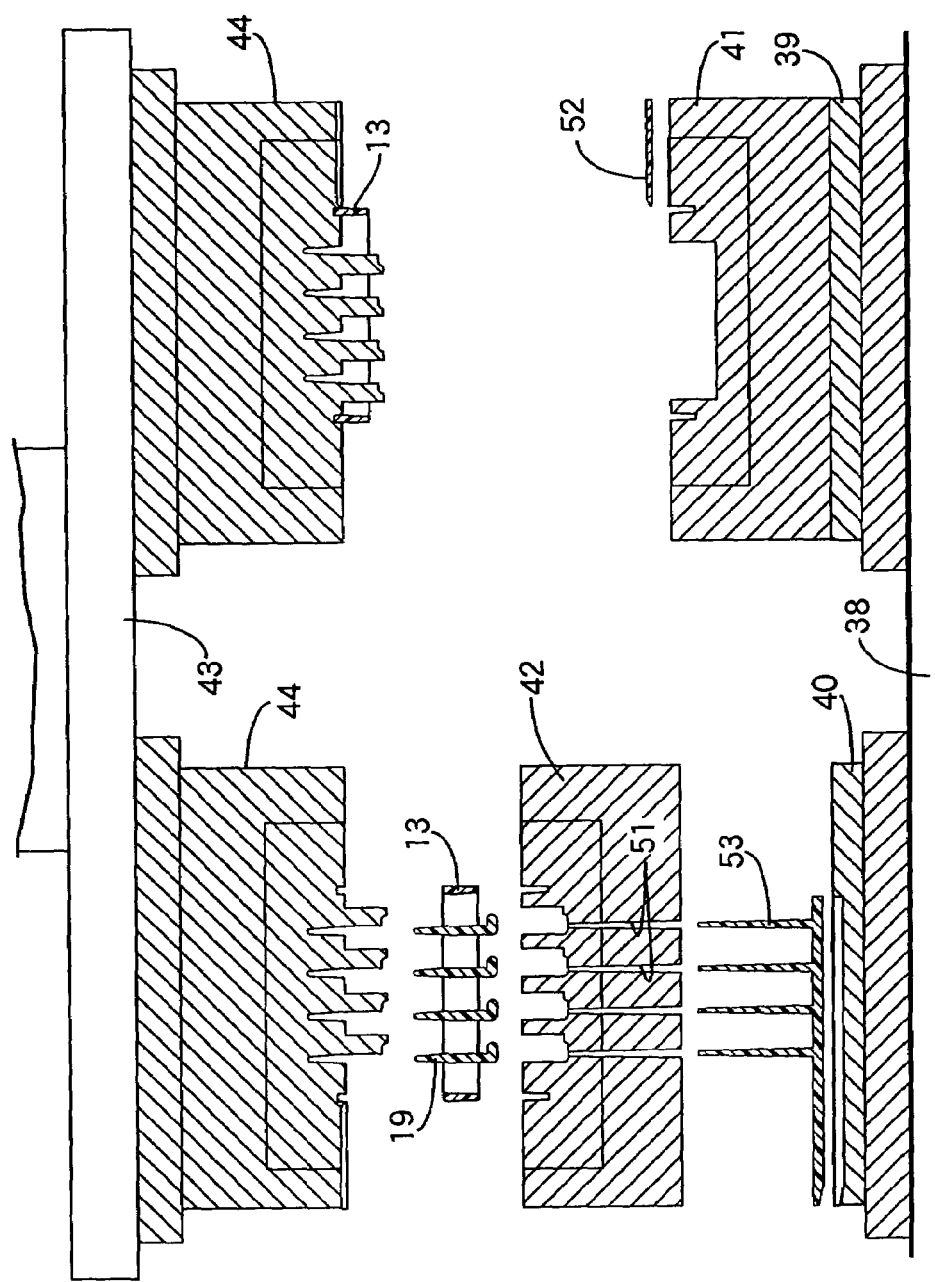
Figure 8:
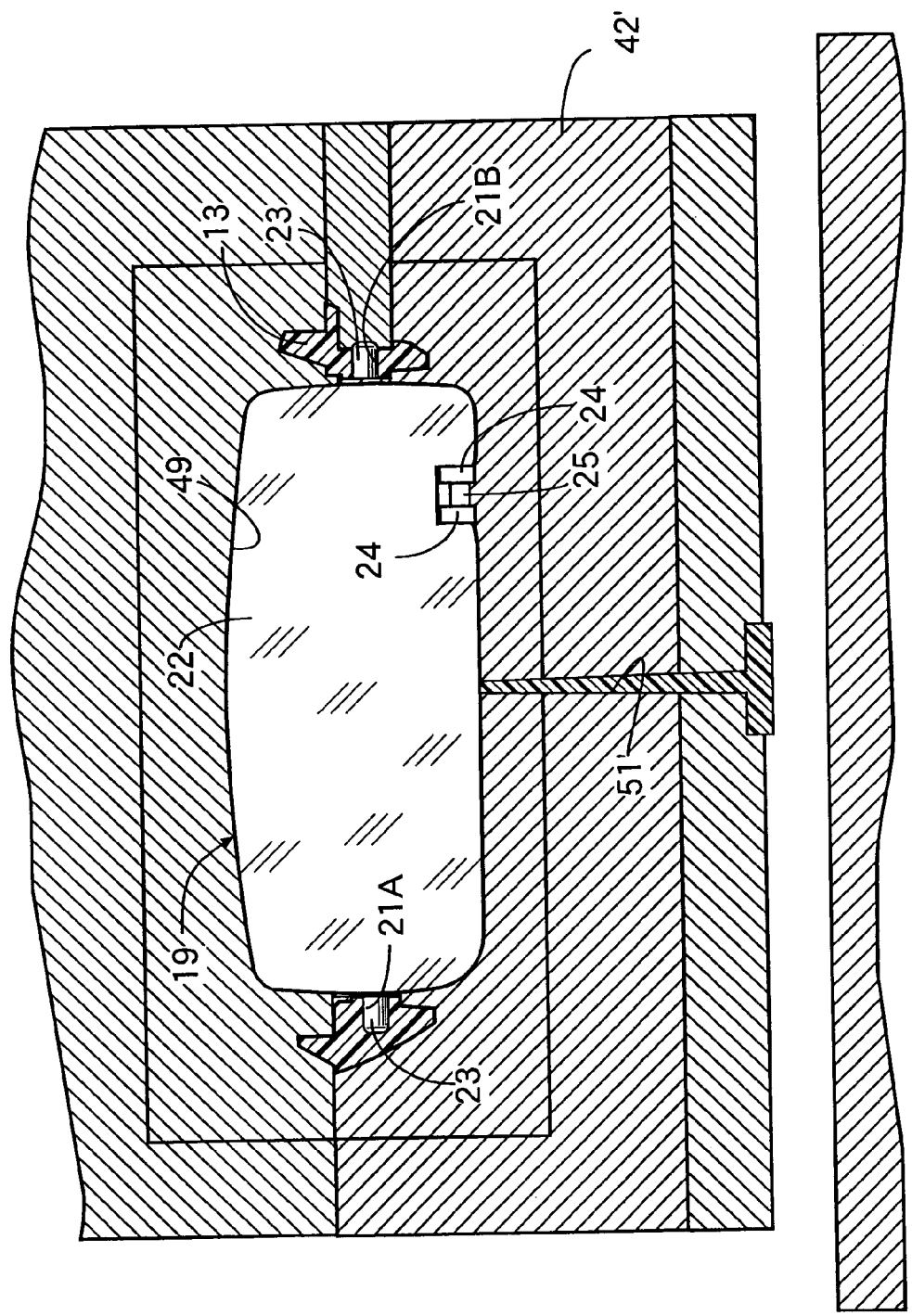
FIG. 8 is a cross section of a conventional two-stage injection-molding device during molding.

In injection molding using such an injection molding device, after completing molding of the rear housing 13 by means of the mold device 45 and molding of the second blades 19 by means of the mold device 48, as shown in FIG. 7, the up/down and pivot mount 43 and the second lower mold 42 are raised. By so doing, the rear housing 13 thus molded is held by the upper mold 44 and a runner 52 formed in the gate 47 is removed, the rear housing 13 and the second blades 19 thus molded are taken out, and raising the second lower mold 42 further allows a runner 53 formed in the gates 51 of the mold device 48 to be removed.

Subsequently, the second lower mold 42 is lowered and fixed on top of the second receiving plate 40, and the up/down and pivot mount 43 is pivoted through 180 degrees and then is lowered. By so doing, the upper mold 44, out of which the rear housing 13 and the second blades 19 have been removed, is moved above the first lower mold 41 to newly form the mold device 45. Also, the upper mold 44 holding the rear housing 13 is moved above the second lower mold 42 to newly form the mold device 48. That is, molding of the rear housing 13 by means of the mold device 45 in the primary injection step and molding of the second blades 19 by means of the mold device 48 in the secondary injection step can be carried out in synchronization in positions adjacent to each other on the pedestal 38, thereby efficiently carrying out two-stage injection-molding of the rear housing 13 and the second blades 19 to form the air conditioner outlet vent device.

The operation of this embodiment is now explained. When carrying out two-stage injection-molding for the air conditioner outlet vent device in which the rear housing 13 of the housing 11 is molded in the primary injection step, and the plurality of second blades 19 pivotably supported by the rear housing 13 are injection-molded in the secondary injection step while utilizing the shaft holes 21A, 21B of the rear housing 13 as the support shaft formation cavities 50, the molten resin is injected from the plurality of gates 51 into portions of the cavities 49 formed within the mold device 48 in a closed mold state, the portions each corresponding to at least one of the pair of projections 24 of the secondary blades 19.

Because of this, portions of the cavities 49 corresponding to the projections 24 and the link shafts 25 connecting the projections 24 are filled with the molten resin at the beginning of the injection of the molten resin. It is therefore possible to prevent the portions corresponding to the projections 24 and the link shafts 25 from being incompletely filled, prevent the projections 24 and the link shafts 25 from having imperfect shapes, and also prevent inadequate strength caused by insufficient resin density even if the external shape is molded.

As a result, it is unnecessary to take measures to fill the portions corresponding to the link shafts 25 with sufficient molten resin, and it is therefore possible to prevent the formation of flashing and prevent the left and right support shafts 23 of the second blades 19 from being overfilled within the shaft holes 21A, 21B of the rear housing 13, thus ensuring that the second blades 19 can pivot smoothly, and even when a synthetic resin with a high injection speed is used, any deterioration of the surface appearance can be prevented. Furthermore, weld lines are not caused in base parts of the projections 24; even when talc, etc. is mixed with the molten resin, the weld strength of the base parts of the projections 24 does not deteriorate; and changing the thickness of the projections 24 enables the gate diameter to be changed, thereby increasing the degrees of freedom in changing the gate diameter.

Although an embodiment of the present invention has been explained above, the present invention is not limited by the above-mentioned embodiment and can be modified in a variety of ways without departing from the spirit and scope of the present invention described in the claims.

For example, the present invention can also be applied to two-stage injection-molding of an air conditioner outlet vent device that includes a blade in which one end of a link shaft is connected to a single projection projecting from a blade main body.

What is claimed is:

1. A method of two-stage injection molding of an air conditioner outlet vent device that includes a synthetic resin housing having a pair of side walls having a plurality of matching pairs of shaft holes provided therein; a plurality of synthetic resin blades each integrally having a blade main body, support shafts projecting from the blade main body so as to be pivotably fitted in a matching pair of the shaft holes, a projection projecting from the blade main body at a position displaced to the rear of the support shafts, and a link shaft having an axis parallel to the support shafts and being connected to the projection, the blades being disposed in parallel to each other within the housing; and a link for connecting the link shafts of the blades;

the method comprising a primary injection step of molding the housing; and a subsequent secondary injection step of injection-molding the plurality of blades including the projection and link shaft thereof while utilizing the shaft holes of the housing as support shaft formation cavities for injection molding the support shafts;

wherein, in the secondary injection step, a molten resin is injected into cavities formed within a mold device in a closed mold state from a plurality of gates provided in portions of the mold device to form each blade including the projection and link shaft thereof, each gate corresponding to the projections of the blades.

2. The method of two stage injection molding of an air conditioner outlet vent device according to claim 1, wherein molding of the housing in the primary injection step and molding of the blades in the secondary injection step are carried out in synchronization at positions adjacent to each other.

* * * * *